United States Patent [19]

Fava

[11] 4,278,775
[45] Jul. 14, 1981

[54] MALEIMIDE-STYRENE COPOLYMER BLEND WITH POLYPHENYLENE OXIDE

[75] Inventor: Ronald A. Fava, Monroeville, Pa.

[73] Assignee: Arco Polymers, Inc., Philadelphia, Pa.

[21] Appl. No.: 161,806

[22] Filed: Jun. 23, 1980

[51] Int. Cl.³ .............................................. C08L 71/04
[52] U.S. Cl. .................................................... 525/132
[58] Field of Search ........................................ 525/132

[56] References Cited

U.S. PATENT DOCUMENTS

| | | | |
|---|---|---|---|
| 4,097,550 | 6/1978 | Haaf et al. | 260/42.18 |
| 4,129,614 | 12/1978 | Fava | 525/93 X |
| 4,129,615 | 12/1978 | Fava | 525/93 X |
| 4,131,598 | 12/1978 | Abolins et al. | 525/132 |
| 4,160,792 | 7/1979 | Fava | 525/148 |

Primary Examiner—Carman J. Seccuro
Attorney, Agent, or Firm—John R. Ewbank

[57] ABSTRACT

An advantageous blend suitable for the molding of plastic articles is prepared by mechanically mixing a polyphenylene ether resin and a polymeric resin derived from maleimide and styrene.

4 Claims, No Drawings

MALEIMIDE-STYRENE COPOLYMER BLEND WITH POLYPHENYLENE OXIDE

RELATED APPLICATIONS

Reference is made to the concurrently filed application of Ronald Fava, Ser. No. 162,000, filed June 23, 1980, concerned with a blend of rubber-modified styrene-maleimide with polyphenylene oxide.

PRIOR ART

Polyphenylene oxide is an example of a polymer having a softening point which is sufficiently high that it is not practicable to employ some conventional equipment for molding articles of polyphenylene oxide. However, polyphenylene oxide has been a component in blends which can be molded at temperatures of interest to some fabricators.

The copolymer of styrene and maleimide has a softening point which is significantly higher than that for conventional polystyrene. Various proposals have been made for blends comprising the copolymer of styrene and maleimide. Fava U.S. Pat. No. 4,160,792 describes a multiple blend of polycarbonate and a copolymer of styrene and maleimide. Fava U.S. Pat. No. 4,122,130 describes multiple blends of polycarbonate and a copolymer of rubber, styrene, and maleimide. Fava U.S. Pat. No. 4,129,614 describes a thermoplastic molding composition blended from polymethyl methacrylate and a copolymer of rubber, styrene and maleimide. Fava U.S. Pat. No. 4,129,615 describes a plastic alloy comprising rubber modified styrene maleic imide, and a copolymer of styrene and methyl methacrylate.

Di Guilio U.S. Pat. No. 3,998,907 describes the preparation of resins comprising maleimide from corresponding resins derived from maleic anhydride precursor by subjecting the resin containing maleic anhydride to treatment with ammonia or a primary amine.

Notwithstanding the significant amount of research work concerned with blends of thermoplastic resins, it was found that most blends of plastics are incompatible. Moreover, only vague guidelines and no reliable rules have evolved in regard to the choice of components in seeking to prepare a compatible plastic alloy by blending a plurality of macromolecular resins.

Notwithstanding the abundance of literature pertinent to appropriate blends of polyphenylene oxide with styrene containing copolymers, there continued to be a persistent demand for a polyphenylene oxide blend suitable for molding items at a convenient temperature and a failure by others to meet such demands satisfactorily.

SUMMARY OF INVENTION

In accordance with the present invention, an advantageous thermoplastic composition is prepared by heat blending a polyphenylene oxide resin and a resin derived from styrene and maleimide. The concentration of each of the components of such blending is desirably within a range from 35% to 65%.

DETAILED DESCRIPTION

The invention is further clarified by reference to an example.

EXAMPLE 1

A blend is prepared using an extruder adapted to recycle a significant portion (about ⅔) of the mixture approaching the exit orifices, with the extrusion of only about one third of the blend approaching the orifices, so that the components are blended under heat, pressure, and mechanical mixing far better than would normally occur in a conventional extruder lacking such recycling. A molding composition is prepared by mixing equal parts of polyphenylene oxide resin and a resin prepared by the copolymerization of styrene and maleimide component. The copolymer contained about 8% maleimide and about 92% styrene.

The components and blend had the following properties:

|  | Izod (ft. lb/inch) | Vicat (1° F.) | Flexural Modulus ($10^3$ psi) | Flexural Strength (psi) |
|---|---|---|---|---|
| PPO | 1.2 | 420 | NA | NA |
| SMI | 0.2 | 259 | 476 | 6400 |
| 50/50 blend | 0.5 | 335 | 413 | 14,200 |

By a series of tests it is established that articles made by molding the blend of 50% of the styrene maleimide and 50% polyphenylene oxide resin had an attractive combination of properties. The fact that the Vicat temperature was 76° higher than for the styrene maleimide resin is indicative of a highly advantageous heat resistance. The fact that the blend had a flexural strength of 14,200 PSI or more than double that of the styrene maleimide is also indicative of advantages from this blend. Moreover, the properties for the blend are superior to those of the blend of polyphenylene oxide resin with a copolymer of styrene and 8% maleic anhydride. The utilization of the imide instead of the anhydride makes feasible the attainment of an advantageous combination of properties.

Pertinent Limits to Invention

By a series of tests it is established that the articles prepared from mixtures containing from about 35% to about 65% of the polystyrene maleimide resin, the balance being polyphenylene oxide resin have many of the advantages outlined for the 50/50% composition. By a series of tests it is established that the styrene-maleimide resin should contain from about 5% to about 35% of maleimide desirably from about 7% to about 14%. The invention features the blending of such styrene-maleimide resin with polyphenylene oxide, the proportions being from about 35% to 65% by weight weight for each resin.

Various modifications of the invention are possible without departing from the scope of the appended claims.

The invention claimed is:

1. A thermoplastic composition for molding of plastic articles consisting of a blend of
   A. polyphenylene oxide
   B. a resin containing 5 to 35% maleimide and and 86 to 93% styrene
   each of components A and B being present in a weight concentration within a range from 35% to 65%.

2. The thermoplastic composition of claim 1 in which the resin contains 7 to 14% maleimide.

3. The thermoplastic composition of claim 1 in which the resin B contains 7 to 14% maleimide.

4. The thermoplastic composition of claim 1 in which the resin B contains about 8% maleimide.

* * * * *